(12) United States Patent
Tully et al.

(10) Patent No.: US 11,269,972 B2
(45) Date of Patent: Mar. 8, 2022

(54) DATE-SPECIFIC WEBPAGE VERSIONS

(71) Applicant: Target Brands, Inc., Minneapolis, MN (US)

(72) Inventors: James Patrick Tully, Ramsey, MN (US); Marcus Malcolm Rosenow, St. Louis Park, MN (US); Jorge Alberto Trujillo, Minneapolis, MN (US); Dakota Reese Brown, St. Paul, MN (US); Matthew Darren Dordal, St. Paul, MN (US); Christopher Edward Johnson, Plymouth, MN (US); Shannon Blandford, Burnsville, MN (US)

(73) Assignee: Target Brands, Inc., Minneapolis, MN (US)

( * ) Notice: Subject to any disclaimer, the term of this patent is extended or adjusted under 35 U.S.C. 154(b) by 520 days.

(21) Appl. No.: 15/168,967

(22) Filed: May 31, 2016

(65) Prior Publication Data
US 2017/0344525 A1    Nov. 30, 2017

(51) Int. Cl.
G06F 3/00        (2006.01)
G06F 16/958      (2019.01)
G06F 16/21       (2019.01)

(52) U.S. Cl.
CPC .......... *G06F 16/972* (2019.01); *G06F 16/219* (2019.01)

(58) Field of Classification Search
CPC ............. G06F 17/2288; G06F 3/04842; G06F 17/2247; G06F 17/3089; G06F 17/30899
See application file for complete search history.

(56) References Cited

U.S. PATENT DOCUMENTS

| | | | |
|---|---|---|---|
| 5,781,909 A | | 7/1998 | Logan et al. |
| 5,794,257 A | | 8/1998 | Liu et al. |
| 5,809,492 A | | 9/1998 | Murray et al. |
| 6,119,133 A | * | 9/2000 | Nusbickel ......... G06F 17/30017 |
| 7,010,742 B1 | | 3/2006 | Hsu et al. |
| 7,249,067 B2 | | 7/2007 | Doerksen et al. |
| 7,996,282 B1 | | 8/2011 | Scott et al. |
| 8,312,015 B1 | | 11/2012 | Trevelyan |
| 9,779,065 B1 | * | 10/2017 | Lee ..................... G06F 17/212 |
| 2001/0037258 A1 | | 11/2001 | Barritz |
| 2002/0194151 A1 | | 12/2002 | Fenton et al. |

(Continued)

FOREIGN PATENT DOCUMENTS

WO    01/46776 A2    6/2001
WO    2012/131430 A1    10/2012

OTHER PUBLICATIONS

Prosecution history of U.S. Appl. No. 15/168,957 including: Notice of Allowance and Examiner-Initiated Interview Summary dated Mar. 26, 2019.

(Continued)

*Primary Examiner* — Kyle R Stork
(74) *Attorney, Agent, or Firm* — Theodore M. Magee; Westman, Champlin & Koehler, P.A.

(57) ABSTRACT

A computer-implemented method includes a webpage design server comparing a current date to a start date associated with a version of a webpage and when the current date is after the start date, the webpage design server automatically altering a webpage delivery system so that the version of the webpage is returned by the webpage delivery system when the webpage is requested.

17 Claims, 12 Drawing Sheets

(56) References Cited

U.S. PATENT DOCUMENTS

| | | |
|---|---|---|
| 2003/0154197 A1 | 8/2003 | Millet et al. |
| 2003/0195810 A1 | 10/2003 | Raghupahty et al. |
| 2004/0133542 A1 | 7/2004 | Doerksen et al. |
| 2004/0194035 A1 | 9/2004 | Chakraborty |
| 2005/0010865 A1 | 1/2005 | Kuppusamy et al. |
| 2005/0108626 A1 | 5/2005 | Ong |
| 2006/0041553 A1 | 2/2006 | Paczkowski et al. |
| 2006/0106683 A1 | 5/2006 | Fisher et al. |
| 2006/0167864 A1 | 7/2006 | Bailey et al. |
| 2007/0067728 A1 | 3/2007 | Lo et al. |
| 2007/0179946 A1 | 8/2007 | Wissner-Gross |
| 2007/0299932 A1 | 12/2007 | Kulkarni |
| 2008/0109808 A1* | 5/2008 | Wing .............. G06F 17/30011 718/102 |
| 2008/0319976 A1 | 12/2008 | Morris et al. |
| 2009/0112842 A1 | 4/2009 | Wang et al. |
| 2009/0138589 A1 | 5/2009 | Wunderlich |
| 2009/0150345 A1 | 6/2009 | Van Luchene |
| 2009/0171721 A1 | 7/2009 | LeBaron et al. |
| 2009/0319377 A1 | 12/2009 | Gazetova et al. |
| 2011/0061011 A1 | 3/2011 | Hoguet |
| 2011/0072338 A1 | 3/2011 | Caldwell |
| 2011/0208822 A1 | 8/2011 | Rathod |
| 2011/0276578 A1 | 11/2011 | Allalouf et al. |
| 2012/0005044 A1 | 1/2012 | Doleman |
| 2012/0054075 A1 | 3/2012 | Ostroff |
| 2012/0229500 A1 | 9/2012 | Lamoureux et al. |
| 2012/0233528 A1* | 9/2012 | Holt .................. G06F 17/24 715/205 |
| 2013/0031032 A1 | 1/2013 | Mehta et al. |
| 2013/0166653 A1 | 6/2013 | Sherrets et al. |
| 2013/0218859 A1 | 8/2013 | Trevelyan |
| 2013/0275259 A1 | 10/2013 | Chidambaram |
| 2013/0339886 A1 | 12/2013 | Batham et al. |
| 2014/0214588 A1 | 7/2014 | Verchere |
| 2014/0236917 A1 | 8/2014 | Trevelyan |
| 2014/0379682 A1 | 12/2014 | Du et al. |
| 2015/0212989 A1 | 7/2015 | Rice |
| 2015/0287060 A1 | 10/2015 | Parthasarathy et al. |
| 2016/0224550 A1* | 8/2016 | Morris ................ G06F 16/1873 |
| 2017/0330204 A1 | 11/2017 | Johnson et al. |
| 2017/0345088 A1 | 11/2017 | Trujillo et al. |

OTHER PUBLICATIONS

Oracle E-Business Suite—Jun. 2010.

* cited by examiner

UPDATE NODE: INFANT CAR SEATS

START DATE:

APRIL 2016

| | Sunday | Monday | Tuesday | Wednesday | Thursday | Friday | Saturday |
|---|---|---|---|---|---|---|---|
| < | | | | | | | > |
| | March 27 | 28 | 29 | 30 | 31 | April 1 | 2 |
| | 3 | 4 | 5 | 6 | 7 | 8 | 9 |
| | 10 | 11 | 12 | 13 | 14 | 15 | 16 |
| | 17 | 18 | 19 | 20 | 21 | 22 | 23 |
| | 24 | 25 | 26 | 27 | 28 | 29 | 30 |

702

START TIME:

< < 
02 : 00  AM
> >

704

NEXT

DATE-SPECIFIC WEBPAGE VERSIONS

BACKGROUND

Webservers provide content through the Internet to client devices. The content that is provided by the webserver is uploaded to the webserver from one or more website design devices. When a website is to be changed, a user must access a website design device to upload the changes to the webserver.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes a webpage design server comparing a current date to a start date associated with a version of a webpage and when the current date is after the start date, the webpage design server automatically altering a webpage delivery system so that the version of the webpage is returned by the webpage delivery system when the webpage is requested.

In accordance with a further embodiment, a website design server includes a memory storing attributes for versions of a webpage, the attributes for each version of the webpage including an activation date and time for the version of the webpage and a rule to use to construct the version of the webpage. The server further includes a processor that determines that a current date and time is after an activation date and time of a version of a webpage, and in response to the determination, uses the rule to alter what appears on the webpage.

In a still further embodiment, a method includes displaying a user interface that accepts a future date as input and receiving the input future date. A search is then performed to find a taxonomy of a website that will be active on the input future date. A user interface showing the taxonomy of the website is then generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described herein allow a webpage designer to designate effective dates for versions of webpages such that when a start date for a version of webpage passes, the website is automatically updated to include the new version of the webpage. In the past, when a new version of a webpage was to be used by a webserver, the new version of the webpage would have to be manually uploaded to the webserver. This meant that employees typically had to work late at night and on weekends in order to alter the website during periods of minimal usage. With the embodiments described below, the start date and time for a version of a webpage can be entered and the website design server automatically tracks the date and time and uploads the newest version of the webpage at its start date and time. In further embodiments, the website design server allows a website designer to view past, present and future versions of the entire website by entering a date. Given the date, the website designer server constructs a taxonomy of the entire website that will be active on that date by examining the start dates for the different versions of the webpages that together form the web site.

Figure 1:
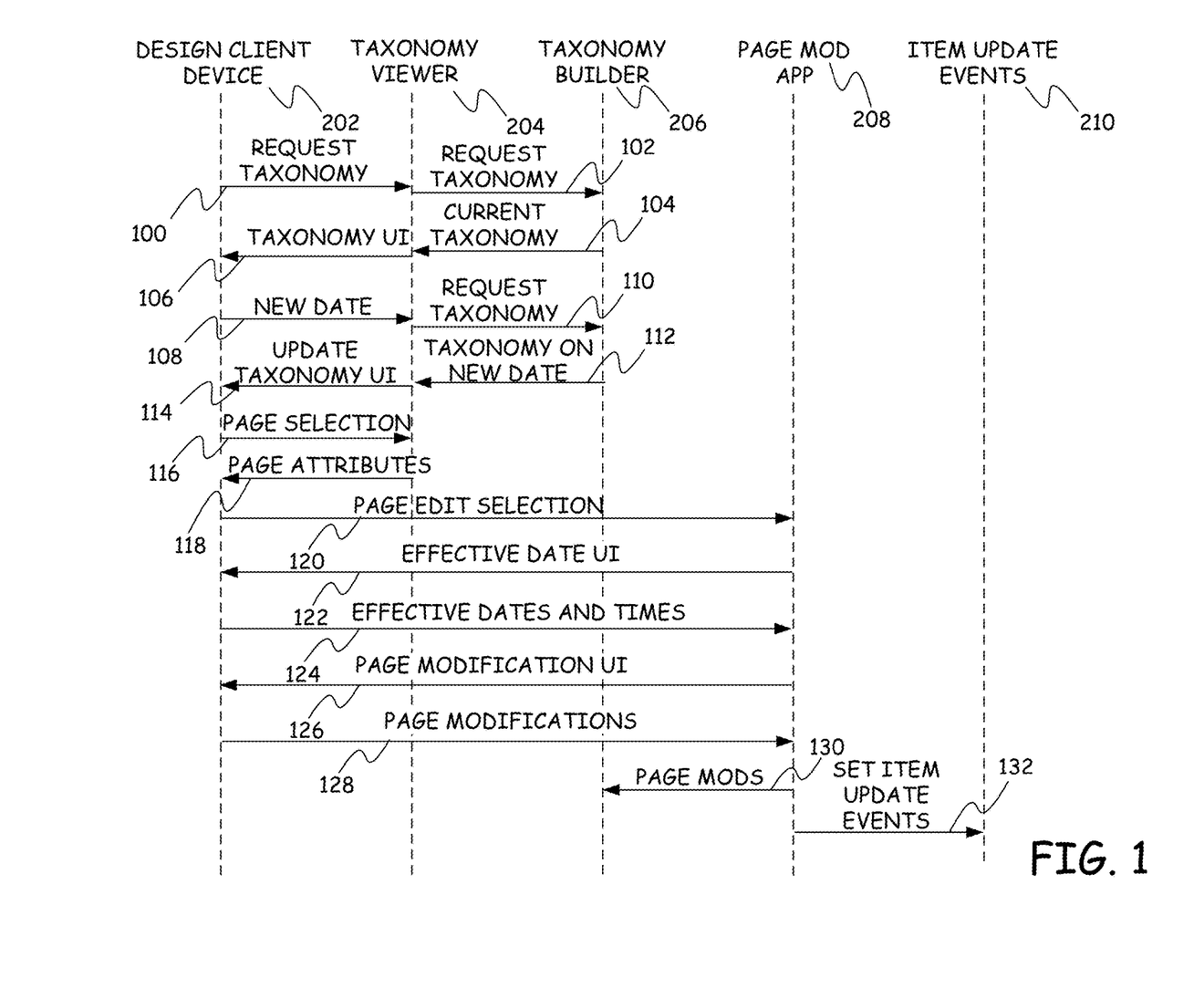
FIG. 1 is a swim lane diagram showing a method of altering a website.
Figure 2:
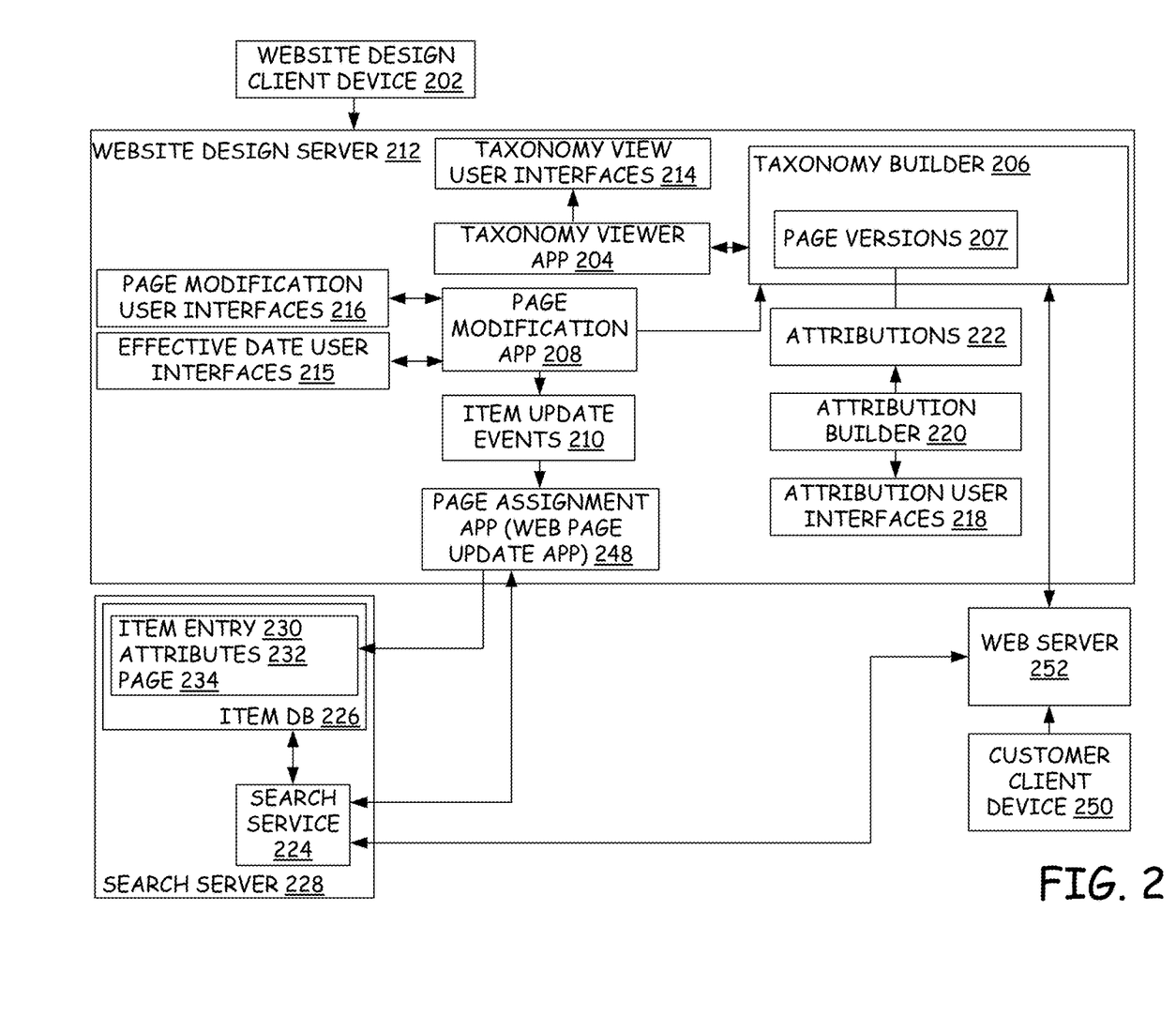
FIG. 2 is a block diagram of a system for automatically updating a webserver using activation dates for content.

FIG. 1 provides a swim lane diagram showing a method of creating a version of a webpage and setting a start date and time for a version of a webpage and FIG. 2 provides a block diagram of elements used in the method of FIG. 1.

At step 100 of FIG. 1, a website design client device 202 requests a taxonomy from a taxonomy viewer app 204 on a website design server 212. In response, taxonomy viewer app 204 requests that taxonomy builder 206 provide the taxonomy for the current date at step 102.

Taxonomy builder 206 stores a collection of page versions 207, which can include multiple versions of each page found on the web site. Each version of a page has an associated start date and end date during which the version of the page is active. Only a single version of a page is active at any one time.

In accordance with one embodiment, the taxonomy has a tree structure that begins at a homepage and traverses through intermediate pages to end pages. The tree structure is described by designating parent and/or child pages for each page in the tree structure. Different versions of a page can have different parent pages and different child pages. As a result, the taxonomy of the website can change as different versions of the pages become active.

Given a date and time, taxonomy builder 206 can construct the taxonomy tree for a version of the website that will be active on that date and time. In particular, taxonomy builder 206 starts by selecting the version of the homepage that is active on the given date and time. Taxonomy builder 206 then traverses to each child page of the selected version of the homepage. When traversing to a child page, taxonomy builder 206 selects the version of the child page that will be active on that date and time. Taxonomy builder 206 then traverses to the child pages of those child pages and so on in the same manner until the end pages are reached. By keeping track of the versions of the pages that are traversed and the position of those pages relative to other pages in the taxonomy, taxonomy builder 206 is able to construct the taxonomy that will be in effect on the given date and time. Note that for some webpages, no version of the webpage is found in the taxonomy on a given date and time but some version of the webpage is present in the taxonomy on other dates.

Based on the request for the taxonomy that is currently active in step 102, taxonomy builder 206 constructs the taxonomy as described above for the current date and time and returns the current taxonomy at step 104 to taxonomy viewer app 204. Taxonomy viewer app 244 then builds a taxonomy view user interface 214 and returns taxonomy view user interface 214 to client device 202 at step 106.

Figure 3:
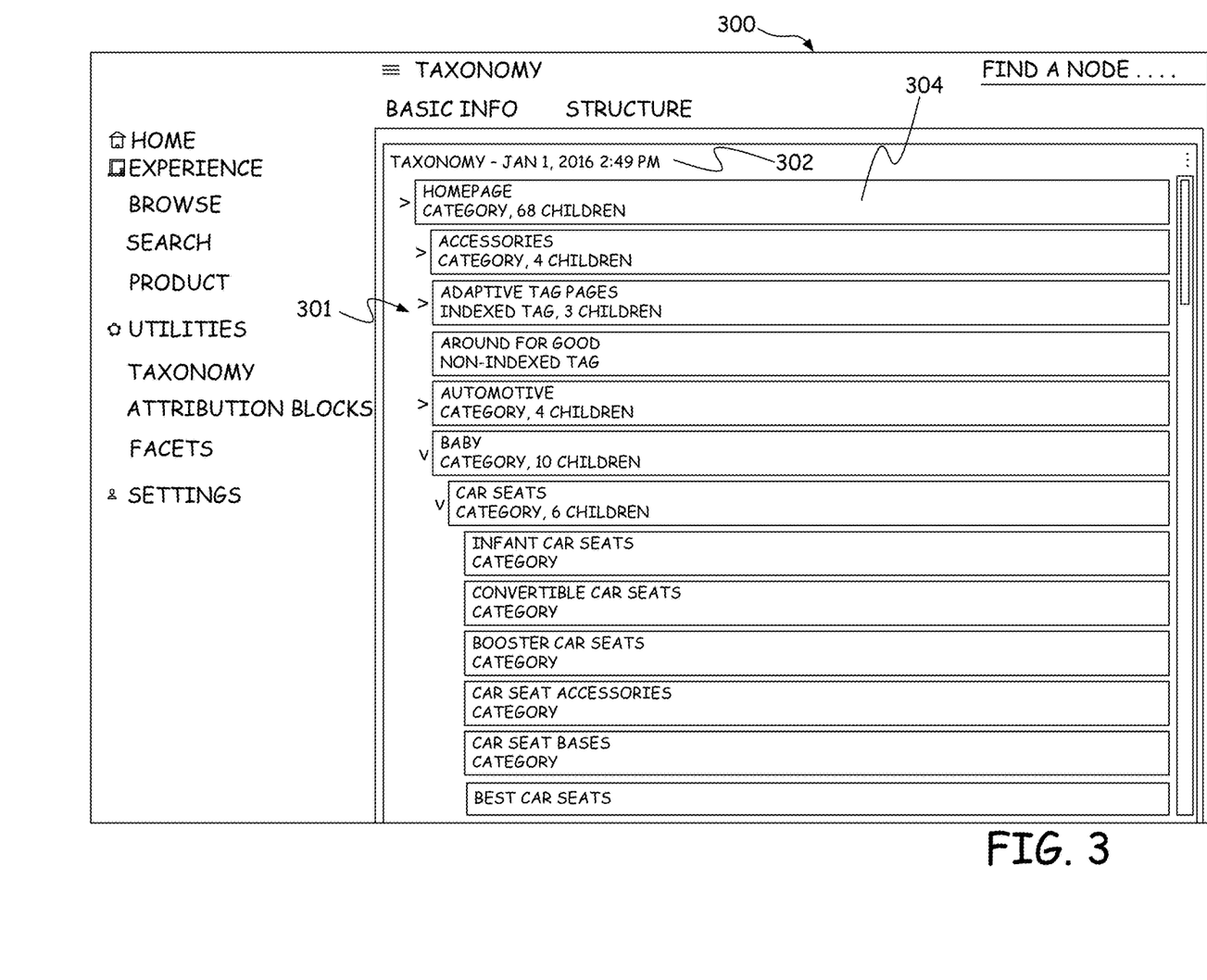
FIG. 3 provides an example user interface showing the selection of a date for a taxonomy.

FIG. 3 provides an example 300 of a taxonomy view user interface 214 showing a returned taxonomy 301 for a current date 302 of Jan. 1, 2016, 2:49 PM. In taxonomy 301, each page is represented by an information box such as homepage information box 304, and the information boxes of child pages are shown indented relative to the information boxes of their parent pages. Each information box includes a name for the page, a type for the page such as Indexed, Non-Indexed, and Category, for example, and the number of child pages that the page has.

Date 302 can be selected by the user and altered by the user in user interface 300. When the user changes date 302, client device 202 sends the new date at step 108 to taxonomy viewer 204. In response, at step 110, taxonomy viewer 204 requests the taxonomy that will be active on the new date from taxonomy builder 206. Using the new date, taxonomy builder 206 rebuilds the taxonomy using versions of pages that will be active on the new date. Taxonomy builder 206 then returns the version of the taxonomy that will be active on the new date to taxonomy viewer 204 at step 112. Taxonomy viewer 204 then updates taxonomy view user interface 214 to reflect the taxonomy for the new date at step 114 and returns taxonomy view user interface 214 to client device 202.

Figure 4:
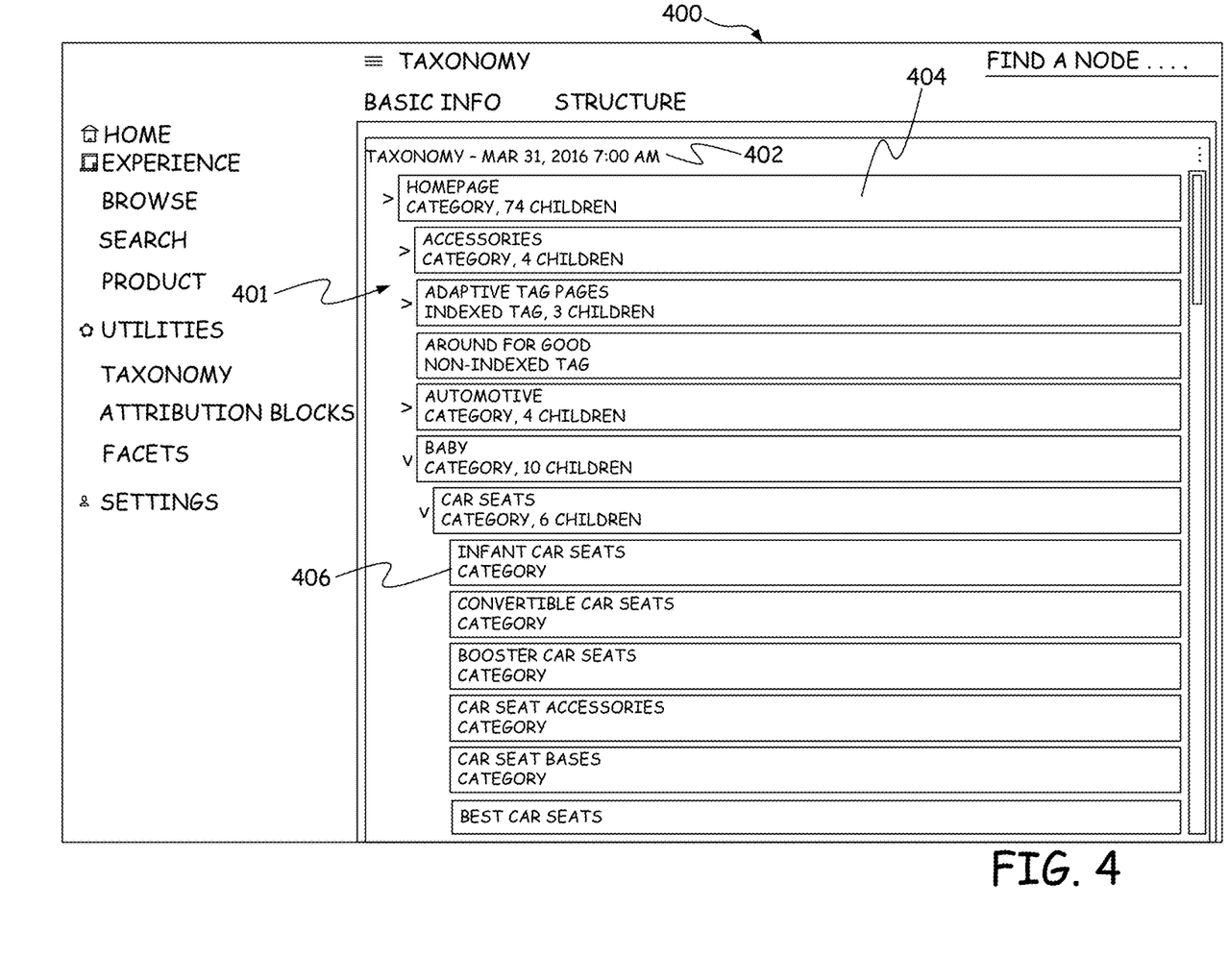
FIG. 4 provides an example user interface showing taxonomy on a selected date.

FIG. 4 provides an example of taxonomy view user interface 214 returned in step 114 showing the taxonomy 401 that will be active on new date 402, which is Mar. 31, 2016 at 7:00 am. Note that taxonomy 401 of user interface 400 is different from taxonomy 301 of user interface 300 in that the homepage has 74 children in user interface 400 but has 68 children in user interface 300 as indicated in the homepage information boxes 304 and 404 of FIGS. 3 and 4, respectively.

At step 116, a user selects a page using taxonomy view user interface 214. For example, the user can select the information box for the page such as information box 406 of user interface 400. In response, at step 118, taxonomy viewer 204 returns attributes of the selected page, which are displayed in an attribute pane 502, such as shown in user interface 500 of FIG. 5.

Figure 5:
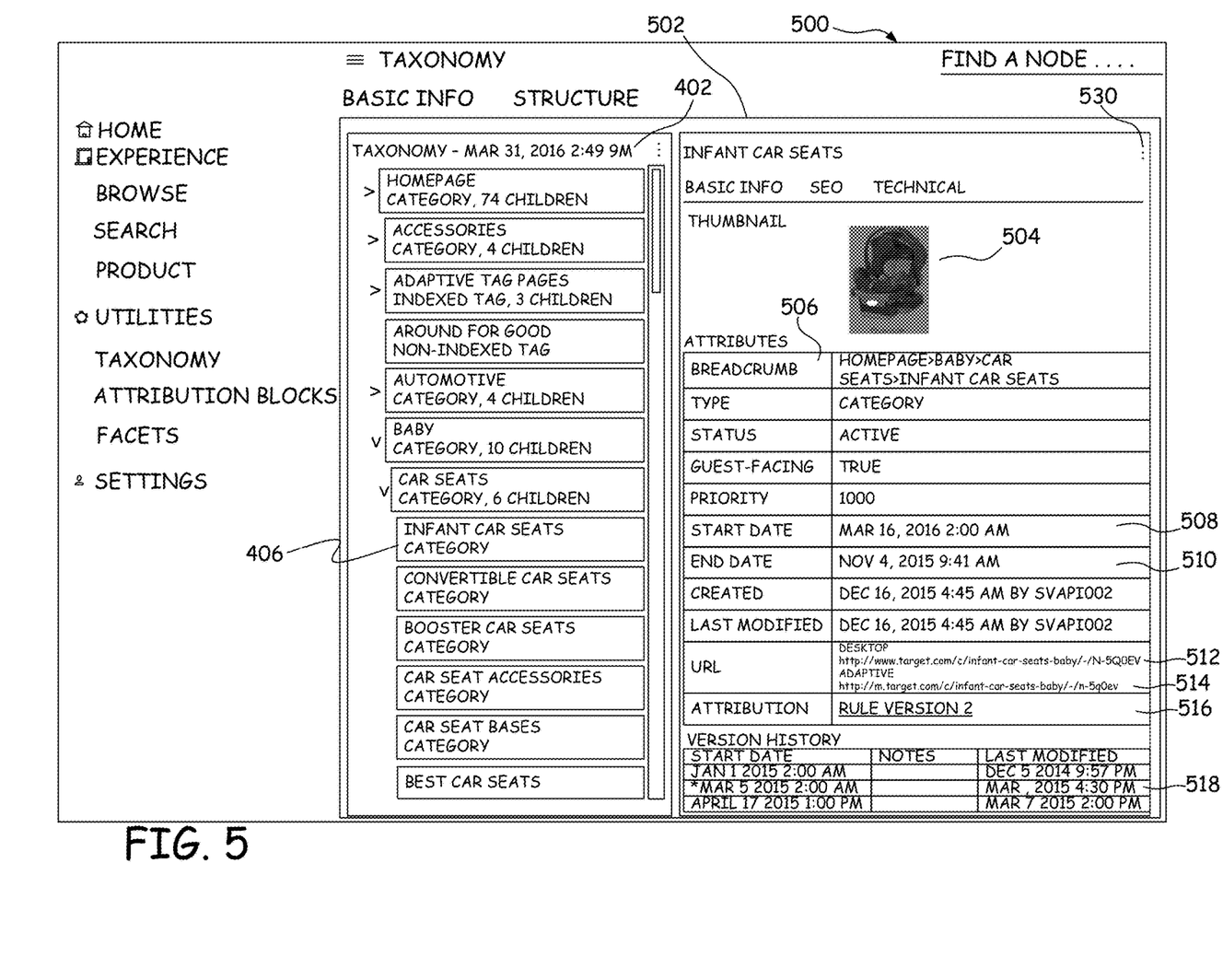
FIG. 5 shows page attributes for a page selected in a taxonomy of a particular date.

Attribute pane 502 includes attributes such as a default image 504 to be shown at the top of the page, a breadcrumb 506 that indicates the position of the page in the taxonomy, a start date 508 and an end date 510 that indicate when this version of the page is to be active, URLs 512 and 514, which provide web addresses for accessing the page directly and attribution 516, which identify the rules to be used to populate items on the page. A version history 518 indicates all of the versions of the page including the start date of each version. The version associated with date 402 of the displayed taxonomy is highlighted in one embodiment.

Figure 6:
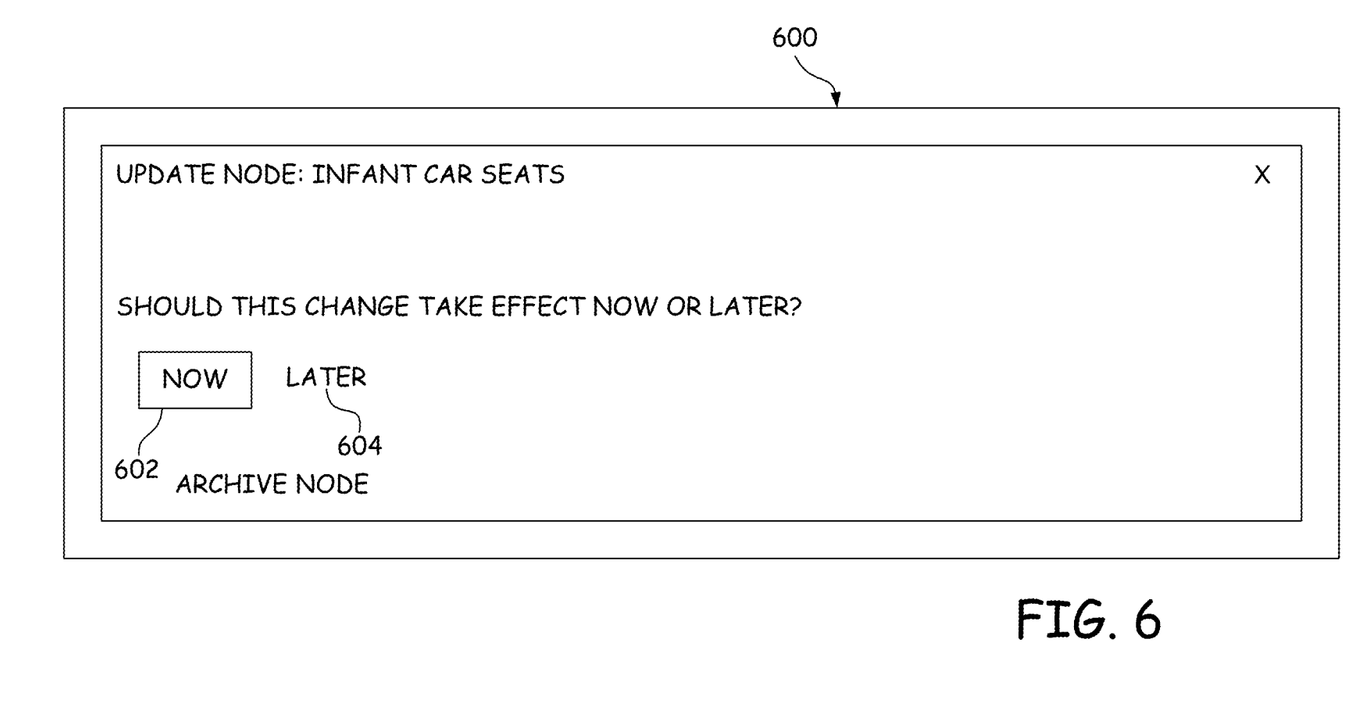
FIG. 6 shows a user interface for designating whether a version of a webpage should take effect now or at a later date.
Figure 7:
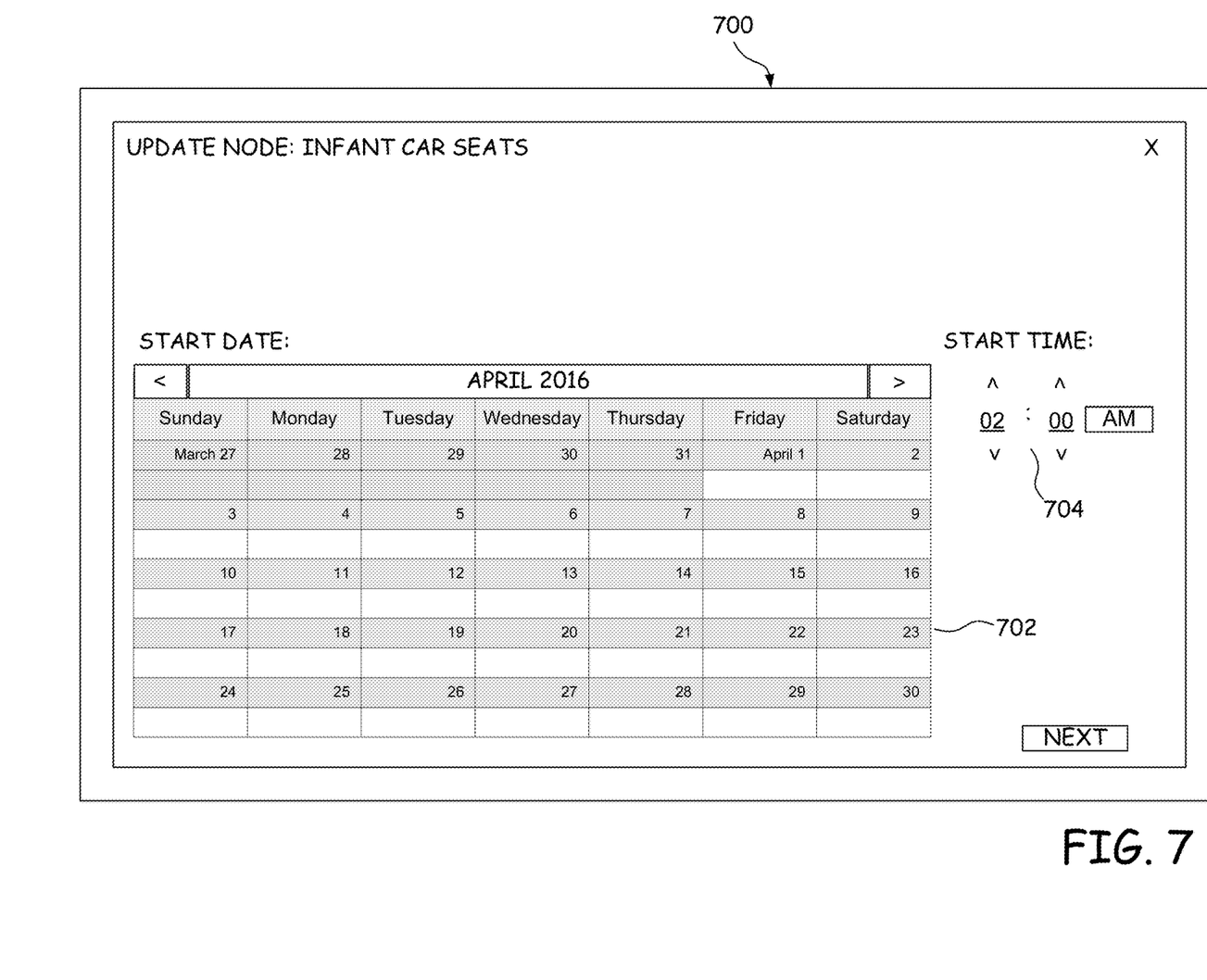
FIG. 7 provides a user interface for setting a later date for a version of a webpage to become effective.

Page attribute pane 502 also includes an edit control 530 that when selected makes a call at step 120 to a page modification app 208. In response, page modification app 208 returns effective date user interface 215 at step 122. FIG. 6 provides an example of a first effective date user interface 600, which is one of the effective date user interfaces 215. In user interface 600, the user can choose between making the edits effective now using control 602 or later using control 604. When the user selects control 604, a user interface 700 is displayed to the user that allows the user to designate a date and time that the new version will become effective. In particular, user interface 700 includes a date control 702 that allows the user to set a date when the new version of the page will be effective and a time control 704 that allows the user to designate a time when the new page will become effective. This date and time are referred to as the start date and time or the activation date and time. In accordance with some embodiments, a user interface similar to user interface 700 is provided that allows the user to designate when this version of the page will stop being effective. In other words, a user interface is provided that allows the user to designate an end date and end time for this version of the webpage.

Figure 8:
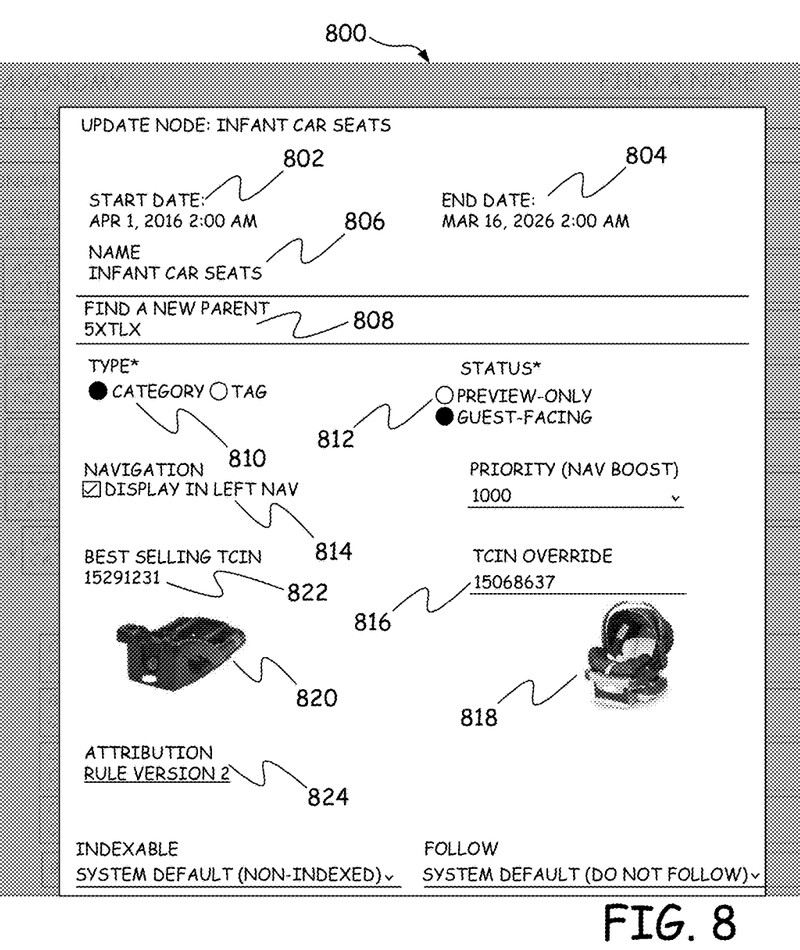
FIG. 8 shows an example user interface for altering attributes of a webpage to form a new version of the webpage.

At step 124 of FIG. 1, the effective dates and times selected using user interfaces 600 and 700 are returned to page modification app 208. Page modification app 208 then returns a page modification user interface 216 at step 126. FIG. 8 provides an example user interface 800 that is an example of page modification user interface 216. User interface 800 includes a start date 802 and an end date 804 for this version of the webpage, a name 806 and a parent 808 for the webpage. Name 806 and parent 808 may be altered by the user. The type of page 810 may be changed from a category page to a tag page. A category page represents a group of items while a tag page represents a single item. The status of the page 812 may be changed from a guest facing page to a preview only page. A preview only page is not shown by the webserver to client devices. Navigation control 814 indicates whether a navigation control is displayed and where it is displayed on the page. TCIN override 816 provides an identifier for an image 818 that can be shown instead of a default image 820 identified by best-selling TCIN 822. Attribution control 824 allows the user to select which rule version assigned to the webpage is to be used to populate this version of the webpage. Rule versions can be constructed using an attribution user interface 218 provided by an attribution builder 220.

Figure 9:
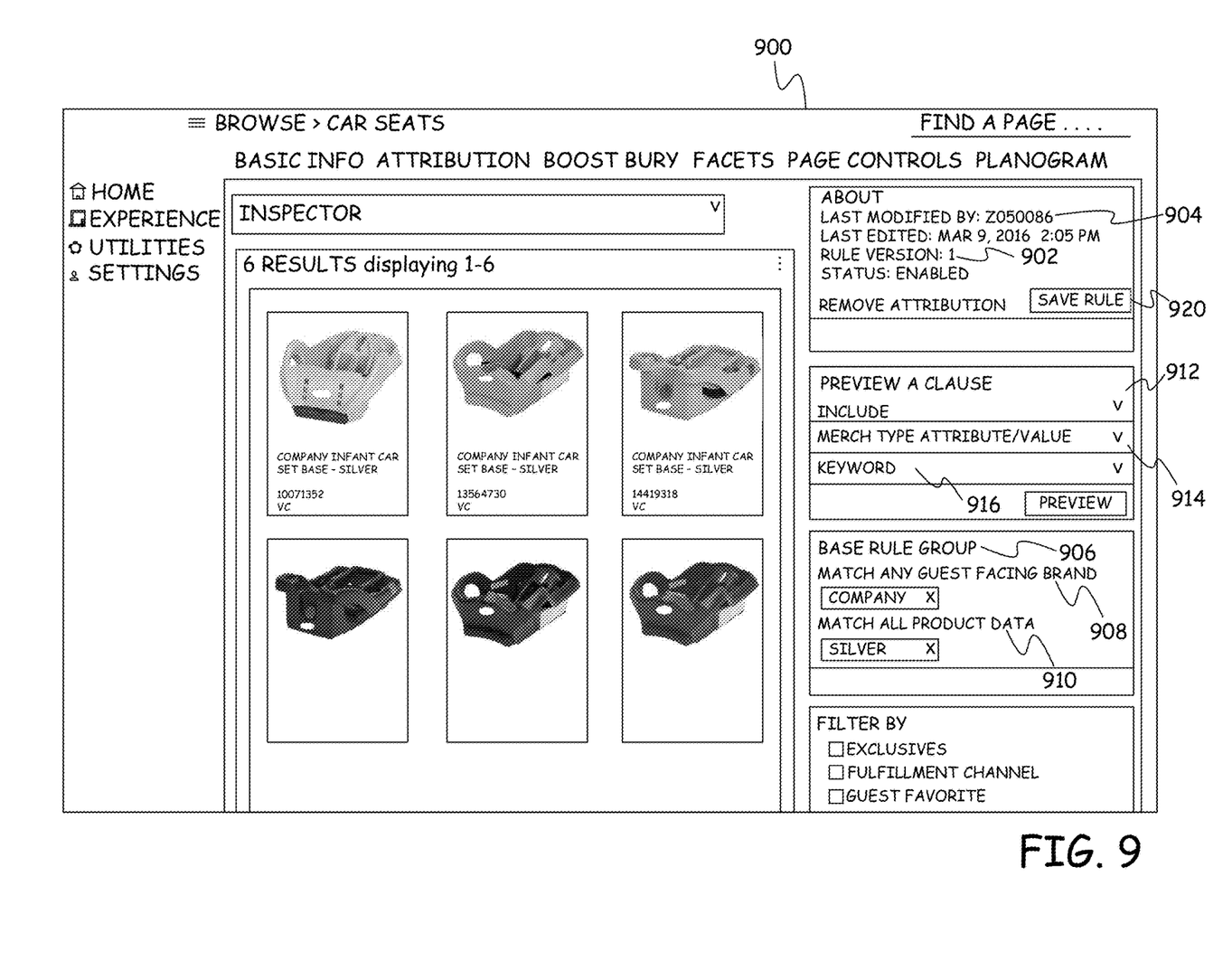
FIG. 9 provides a user interface for altering a rule version to form a new rule that can be used in a version of a webpage.

FIG. 9 provides an example user interface 900, which is one example of an attribution user interface 218. User interface 900 identifies the version 902 of this page's rules and the date this version of the rules was last modified 904. Rule version control 902 can be selected to select a different version of the rule. The existing rule is defined by a base rule group 906, which in FIG. 9 includes the union of two rules 908 and 910. Rule 908 indicates that all products with a brand name of "company" should be included and rule 910 indicates that only products with a "silver" color should be included. Thus, the result of base rule 906 is that all silver products from company will be displayed on pages that use this rule version. Additional rule clauses can be added using include control 912, merch type attribute/values control 914 and keyword control 916. Include control 912 allows the user to select whether the rule will include or exclude the products that match the rest of the rule, merch type attribute/ values control 914 allows the user to select the type of attribute that will be used to select items such as "guest facing brand" or "product data" or to select a previously defined rule known as an attribution rule block, and keyword control 916 allows the user to insert an attribute value for the attribute type selected using merch type attribute/values control 914 or the name of an attribution block. For example, if "product data" is selected as the attribute, the keyword can be a color value. Once the rules have been constructed, the new rule version can be saved using save rule control 920. When save rule control 920 is selected, a new version of the rule is saved as attributions 222. In accordance with one embodiment, attributions 222 are associated with a particular webpage. However, attributions 222 can be used by multiple different versions of that page.

At step 128, the page modifications made through user interface 800 are returned to page modification app 208 and are stored as a page version 207 in taxonomy builder 206 at step 130. In particular, the start date and time (activation date and time) and the end date and time for this version of the page are stored together with other attributes of this version of the page in a memory that holds page versions 207.

At step 132, page modification app 208 sets an item update event 210. Each item update event is a self-triggering event that will cause a page assignment application 248, also referred to as a webpage update application, to be executed when the date and time passes. In accordance with one embodiment, an item update event is stored for the start date of the new version of the webpage and a separate item update event is set for the end date and time of the new version of the webpage. As described further below, when an item update event self triggers, it calls page assignment application 248 to modify the webpage delivery system so that a different version of the page is returned when a customer client device 250 requests the webpage from a webserver 252.

Figure 10:
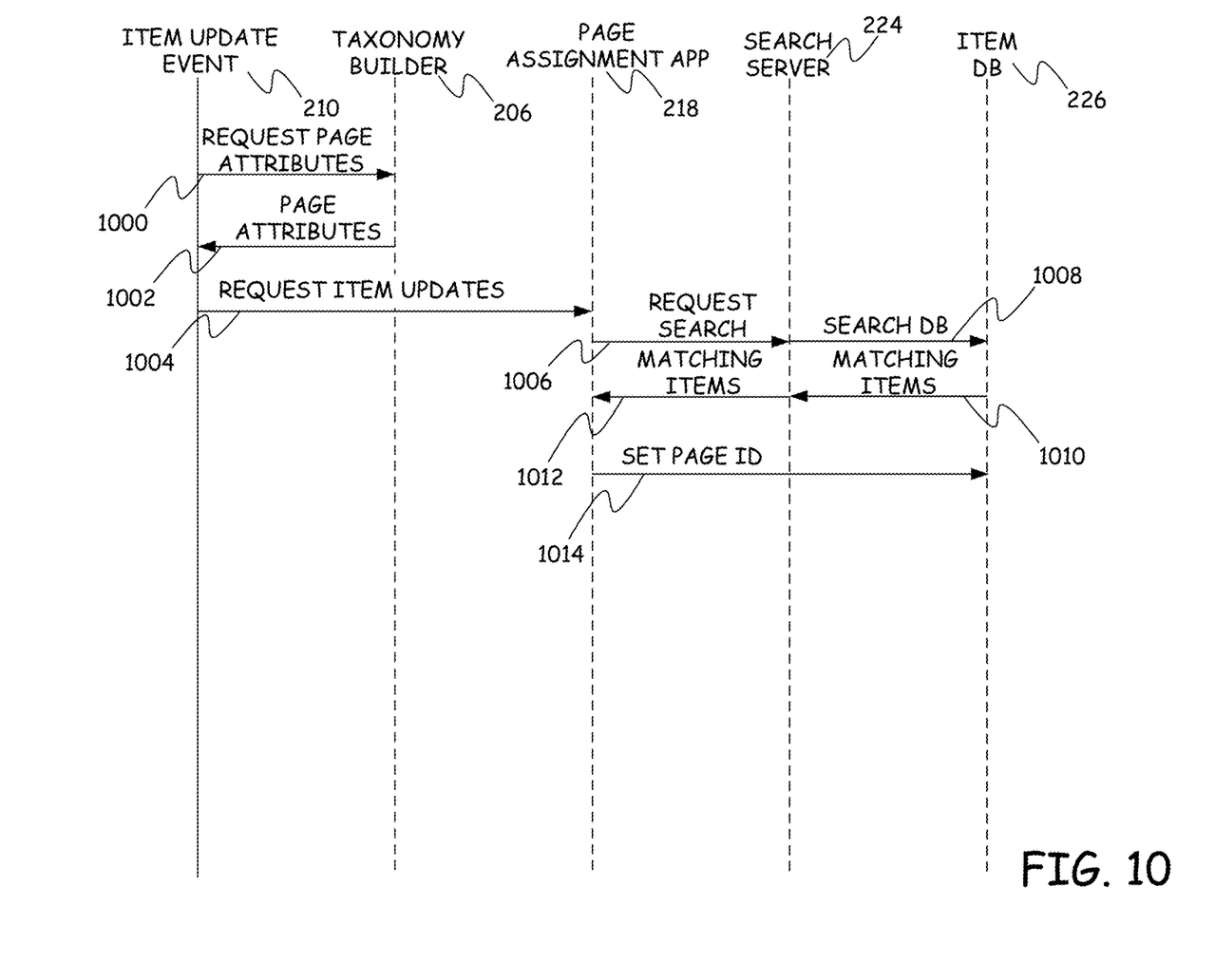
FIG. 10 provides a swim lane diagram showing a method of modifying a webpage delivery system to provide a new version of a webpage.

FIG. 10 provides swim lane diagram showing a method of automatically modifying a webpage delivery system so that it will provide a new version of a webpage when client device 250 requests the webpage. The webpage delivery system includes webserver 252, taxonomy builder 206, search service 224 and item database 226 and modifying the webpage delivery system includes modifying at least one of these components.

At step 1000, item update event 210 self-triggers and sends a request to taxonomy builder 206 for the page attributes of the currently active version of a page. When item update event 210 is self-triggered by a start date of a version of a page, taxonomy builder 206 will return the version of the page that has just begun to be active. When item update event 210 is self-triggered by an end date of a version of a page, taxonomy builder 206 will return attributes for the version of the page with the latest start date that is still active. In accordance with some embodiments, versions of a page can have overlapping active date ranges. When this occurs, taxonomy builder 206 identifies all of the versions for which the current date and time is between the version's start time and end time and then returns the version with the latest start time.

At step 1002, taxonomy builder 206 returns the page attributes for the currently active version of the page. Item update event 210 extracts the attribution rules, which define the products that will appear on the web page, from the page attributes. At step 1004, item update event 210 forwards the attribution rules to page assignment app 248 together with a request to update item entries 230 in an item database 226 for the products identified by the attribution rules. In particular, item update event 210 requests that a page field 234 for each matching item entry 230 be updated to indicate that the product is to appear in the page.

At step 1006, page assignment app 248 uses the attribution rules to request a search from search service 224 on a search server 228. In response, at step 1008, search service 224 searches item database 226 for all item entries 230 that include attributes 232 that match the requirements of the attribution rules provided by item update event 210. The matching items are returned at step 1010 to search service 224, which forwards the list of matching items to page assignment app 248 at step 1012. For each item in the matching items list, page assignment app 248 stores the page ID for the current webpage in item database 226 at step 1014. Thus, an identifier for the current webpage is stored in page field 234 of item entry 230 for each item returned as matching items in step 1012. By storing the identifier for the webpage in the item entry, it is possible to search item database 226 for the webpage identifier to identify all the items that should be included on the webpage as discussed further below in FIG. 11.

Figure 11:
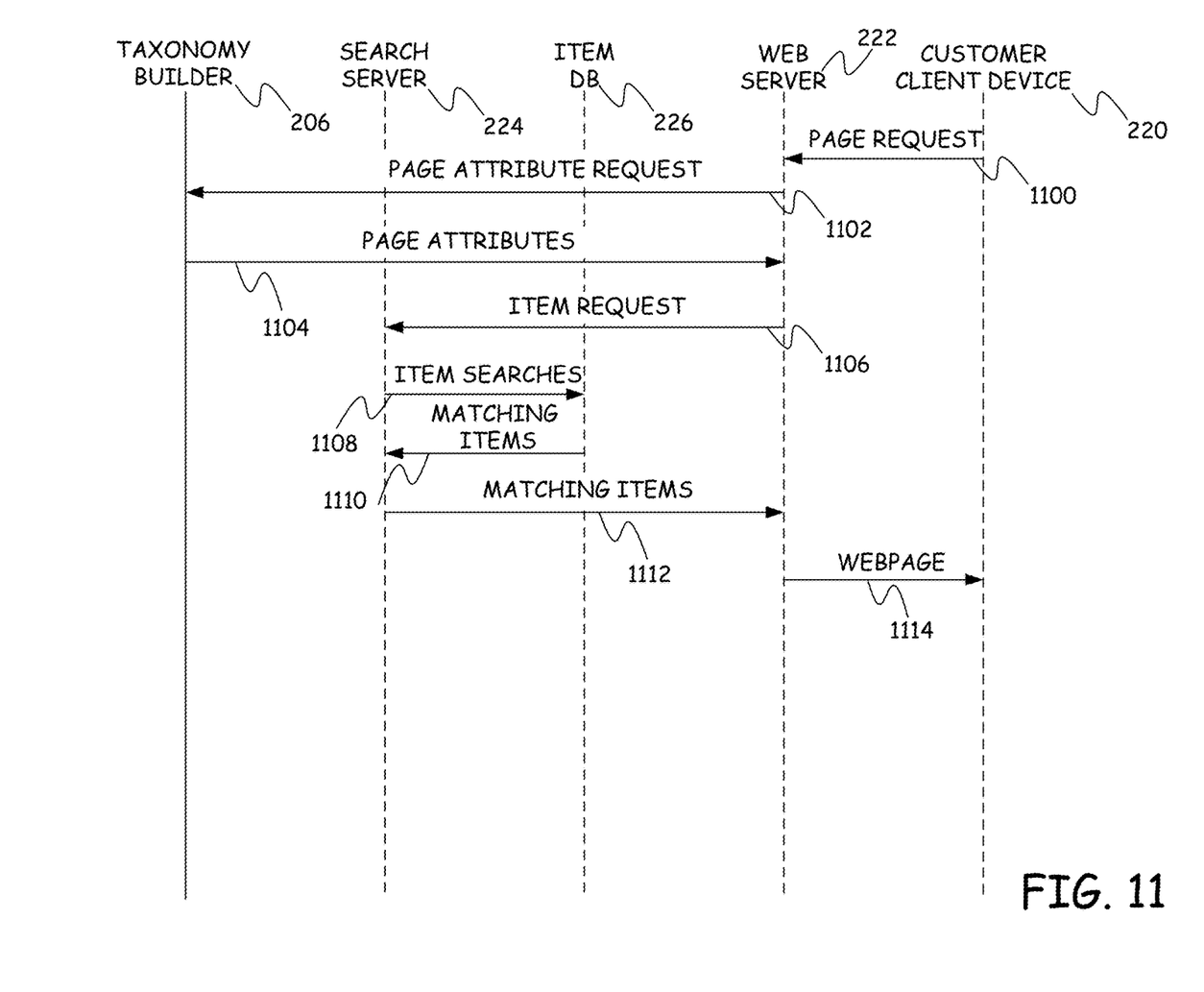
FIG. 11 provides a swim lane diagram of a method for requesting a current version of a page.

FIG. 11 provides a swim lane diagram of a method for requesting a current version of a webpage. At step 1100, a customer client device 250 submits a request for the webpage to webserver 262. In response to the request, webserver 222 requests the attributes of the page from taxonomy builder 206 at step 1102. Taxonomy builder 206 returns the page attributes for the current version of the page. These page attributes include whether the page is guest facing and the image for the top of the page as well as whether the page includes navigational elements. At step 1106, webserver 222 requests a list of the items that should appear on the webpage from search service 224. This request includes the identifier of the webpage. At step 1108, search service 224 searches item database 226 to find all items with a page field 234 that includes the webpage identifier. Item database 226 returns all matching items at step 1110 and search service 224 returns the matching items to webserver 222 at step 1112. Webserver 222 then constructs the user interface representing the webpage using the page attributes returned at step 1104 and the matching items returned at step 1112. The constructed user interface is then returned to customer client device 250 at step 1114.

Figure 12:
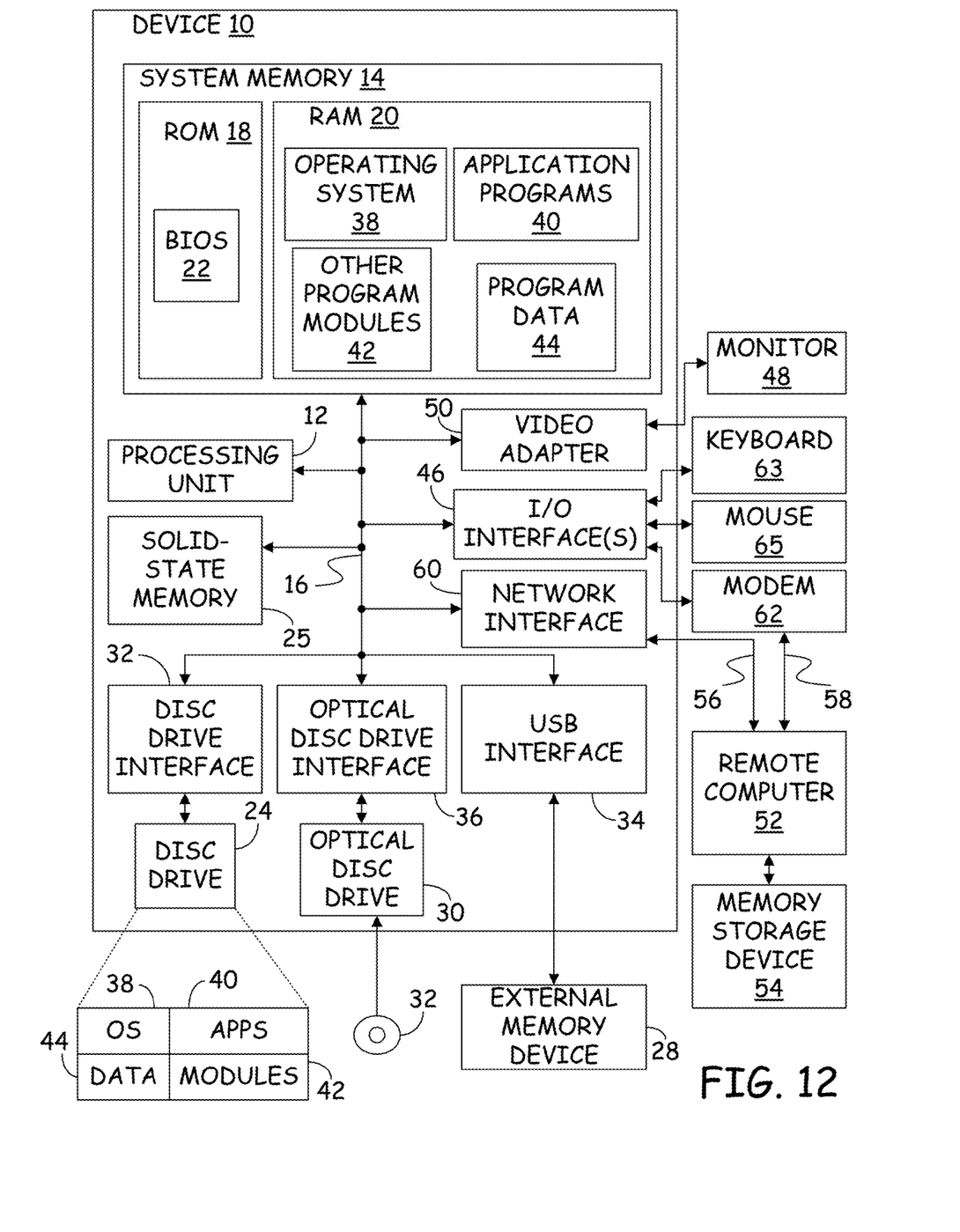
FIG. 12 provides a block diagram of a computing device that can be used in the various embodiments.

FIG. 12 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing website design server 212 and search server 228 including programs for implementing taxonomy viewer app 204, taxonomy builder 206, page modification app 208 (webpage update application 208), item update events 210, page assignment app 248, attribution builder 220 and search service 224, for example. Program data 44 may include data such as attributions 222, page versions 207, item entries 230, and item database 226, for example.

Processing unit 12, also referred to as a processor, executes programs in system memory 14 and solid state memory 25 to perform the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 12. The network connections depicted in FIG. 12 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 12 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
comparing, by a webpage design server, a current date to a start date associated with a version of a webpage; and
when the current date is after the start date, the webpage design server automatically altering a webpage delivery system so that the version of the webpage is returned by the webpage delivery system when the webpage is requested, wherein the webpage design server alters the webpage delivery system by accessing at least one rule associated with the version of the webpage for populating the webpage with items to purchase, using the at least one rule to identify a plurality of items that are to populate the version of the webpage, and for each item in the plurality of items, automatically modifying a respective database entry for the item because the item was identified by the rule such that the entry includes an identifier for the webpage and such that each item in the plurality of items that is to populate the version of the webpage can be located by searching the database for the identifier for the webpage for each request for the webpage without executing the rule separately for each request for the webpage.

2. The computer-implemented method of claim 1 wherein a database contains multiple versions of the webpage, each with a respective different start date.

3. The computer-implemented method of claim 2 wherein each version of the webpage has a start date and an end date and wherein the webpage design server automatically alters the webpage delivery system so that the version of the webpage with the latest start date before the current date and an end date after the current date is returned by the webpage delivery system when the webpage is requested.

4. The computer-implemented method of claim 3 wherein a first version of the webpage has a start date and an end date that are after a start date of a second version of the webpage and before the end date of the second version of the webpage.

5. The computer-implemented method of claim 1 wherein the webpage design server provides a user interface for selecting a start date that a version of a webpage is to begin being returned by the webpage delivery system when the webpage is requested.

6. The computer-implemented method of claim 1 wherein the version of the webpage is the first version of the webpage to appear on a website and wherein automatically altering a webpage delivery system so that the version of the webpage is returned by the webpage delivery system comprises altering a website taxonomy so that the webpage becomes part of the taxonomy.

7. The computer-implemented method of claim 1 wherein the webpage design server further receives a future date and returns attributes of a version of the webpage that will be returned by the webpage delivery system on the future date.

8. A website design server comprising:
a memory storing attributes for versions of a webpage, the attributes for each version of the webpage including an activation date and time for the version of the webpage and a rule to use to construct the version of the webpage;
a processor:
determining when a current date and time is after an activation date and time of a version of a webpage, and in response to the determination, using the rule for the webpage to alter what appears on the webpage by using the rule to identify a plurality of items that are to populate the webpage, and for each of the plurality of items, automatically modifying a respective database entry for the item because the rule identified the item so that the entry includes an identifier for the webpage and such that the item can be located by searching the database for the identifier for the webpage for each request for the webpage without executing the rule separately for each request for the webpage.

9. The website design server of claim 8 wherein the memory stores multiple versions for a single webpage, each version having an activation date and time.

10. The website design server of claim 9 wherein each version further has an end date and time and wherein a first version has an activation date and time and an end date and time that are both between an activation date and time and end date and time of a second version and wherein the processor uses a first rule associated with the first version to alter what appears on the webpage when the current date and time is after the activation date and time of the first version and uses a second rule associated with the second version to alter what appears on the webpage when the current date and time is after the end date and time of the first version.

11. The website design server of claim 8 wherein the processor further receives a date and time and a webpage identifier and in response identifies a version of the webpage that will be active on the received date and time.

12. The website design server of claim 11 wherein the processor provides a taxonomy for an entire web site that will be active on the received date and time.

13. A server comprising:
a processor comparing a current date to a start date associated with a version of a webpage and when the current date is after the start date, automatically altering a webpage delivery system so that the version of the webpage is returned by the webpage delivery system when the webpage is requested wherein the webpage delivery system is altered by accessing at least one rule associated with the version of the webpage for populating the webpage with items to purchase, using the at least one rule to identify a plurality of items that are to populate the version of the webpage, and for each item in the plurality of items, automatically modifying a database entry for the item because the rule identified the item to include an identifier for the webpage such that each item in the plurality of items that is to populate the version of the webpage can be located by searching the database for the identifier for the webpage for each request for the webpage without executing the rule separately for each request for the webpage.

14. The server of claim 13 further comprising a memory containing multiple versions of the webpage, each with a respective different start date.

15. The server of claim 14 wherein each version of the webpage has a start date and an end date and wherein the server automatically alters the webpage delivery system so that the version of the webpage with the latest start date before the current date and an end date after the current date is returned by the webpage delivery system when the webpage is requested.

16. The server of claim 15 wherein a first version of the webpage has a start date and an end date that are after a start date of a second version of the webpage and before the end date of the second version of the webpage.

17. The server of claim 13 wherein the processor provides a user interface for selecting a start date that a version of a webpage is to begin being returned by the webpage delivery system when the webpage is requested.

* * * * *